Dec. 29, 1936.                 W. G. MYLIUS                 2,066,300
                       DETACHABLE METER CONSTRUCTION
                         Original Filed Jan. 19, 1935
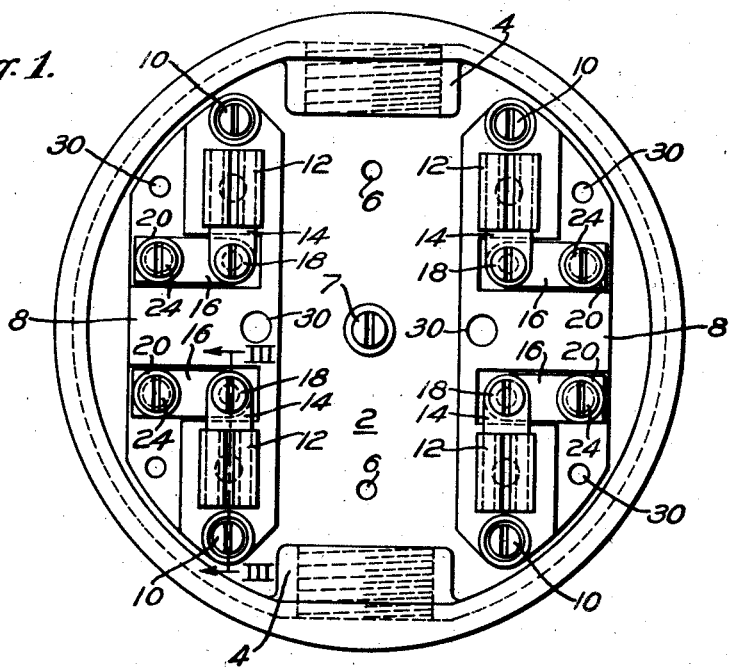
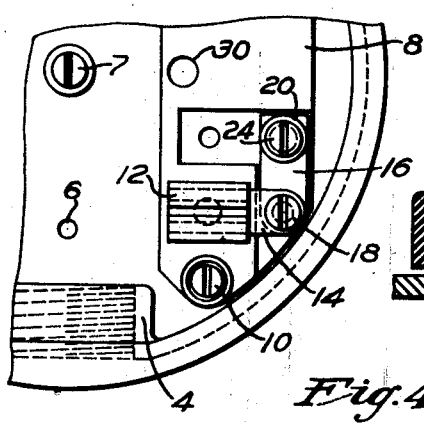
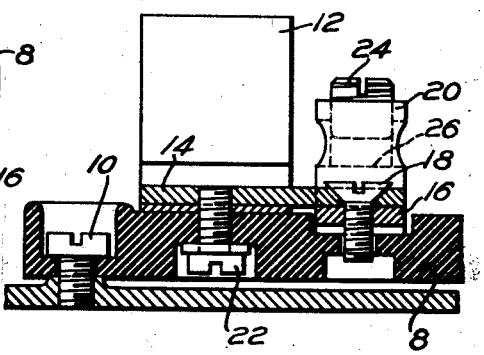
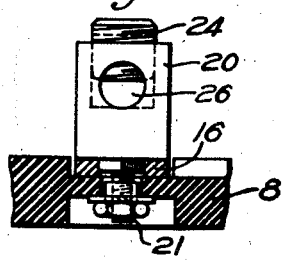
WITNESSES:
INVENTOR
Walter G. Mylius.
BY
ATTORNEY Patented Dec. 29, 1936

2,066,300

UNITED STATES PATENT OFFICE 2,066,300

DETACHABLE METER CONSTRUCTION

Walter G. Mylius, Summit, N. J., assignor to Westinghouse Electric & Manufacturing Company, East Pittsburgh, Pa., a corporation of Pennsylvania Original application January 19, 1935, Serial No. 2,534. Divided and this application March 12, 1936, Serial No. 68,389

1 Claim. (Cl. 173—324)

The present invention relates to watthour meters of the general character shown in United States Patent No. 1,969,499, issued August 7, 1934, and more specifically to an improved construction of the terminal chamber or sub-base upon which such meters are supported.

This application is a division of Serial No. 2,534 filed January 19, 1935 by Walter G. Mylius, assignor to Westinghouse Electric & Manufacturing Company.

In meters of the above mentioned character, usually called the detachable type, four contact blades usually project from the base thereof and are connected inside the meter to the current and potential windings. Two of the blades are for connection to the incoming or supply circuit, and the remaining two are for connection to the load circuit. The terminal chamber or sub-base for such a meter usually comprises, as in the above numbered patent, four contact jaws, two of which are for connection to the supply circuit and the other two to the load circuit, and which are adapted to receive the contact blades projecting from the meter base.

The terminal chamber or sub-base is usually provided with diametrically opposite openings in its side walls for receiving the conduits housing the supply and load leads of the circuit to be inserted. Such conduits may extend vertically, in which event the openings will be in vertical alignment, or the conduits may extend horizontally, necessitating a 90° rotation of the terminal chamber, with an attendant rotation of the jaw alignment.

These alternate possibilities would normally render it necessary to manufacture and stock two lines of chamber, that is, for vertical and horizontal conduit systems, so that the meters may always be installed in a proper upright position, and it is an object of the present invention to avoid this expensive and complicated practice in a simple and satisfactory manner.

Other objects will be apparent from the following description and accompanying drawing wherein:

Figure 1 is a plan view of a terminal chamber or sub-base for a meter of the detachable type embodying the present invention, and showing the contact jaw arrangement for mounting with a vertically extending conduit system.

Fig. 2 is a view of a portion of the structure shown in Fig. 1 adapted for horizontal conduit systems;

Fig. 3 is an enlarged view in section, taken on the line III—III of Fig. 1; and

Fig. 4 is a view in section, parts being broken away, of a terminal used in conjunction with the invention.

Referring more specifically to the drawing, the terminal chamber or sub-base comprises a substantially cylindrical chamber 2 having diametrically-opposed threaded bosses 4 for receiving suitable conduit fittings. It is contemplated that the supply conductors will enter through one of the threaded bosses 4 and be connected with the supply terminals within the chamber, as hereinafter described, and the load conductors connected to other terminals will leave the chamber through the other threaded boss 4.

The chamber 2 may be secured to a support in any suitable manner, as by inserting screws through apertures 6, or by making use of the centrally disposed screw 7 which may also be used for making a ground connection, if such is required.

Within the chamber 2 are disposed two terminal blocks 8, suitably secured to the base of the chamber, as by screws 10, and disposed on opposite sides of the threaded bosses 4 to define substantially a channel communicating with such bosses for receiving the circuit conductors.

Each terminal block 8 has secured thereon two contact jaws 12 each of which is electrically connected to a conducting strap 14 secured to a strap 16 by means of a screw 18. The strap 16 is electrically connected with a terminal post 20, adapted to be connected to one of the wires of the circuit with which the meter is to be associated.

It is contemplated, in usual practice, that two service conductors will enter through the upper boss 4 and be respectively connected to the upper terminal posts 20, and two load conductors will extend through the lower boss 4 and be electrically connected to the lower terminal posts 20.

Each contact jaw 12 comprises a member of substantially U-shape, preferably of resilient strip material, having the free ends thereof return-bent to define a slot for receiving a contact blade projecting from the base of a detachable meter. As shown in Fig. 3, the jaw 12 is maintained in position by means of a screw 22, extending upwardly through the block 8 and the base of the jaw, into threaded engagement with the one end of the conducting strap 14.

The confronting surfaces of the jaw 12 are spaced a distance less than the thickness of a contact blade of the meter, and the extremities of such surfaces may be in contacting relation, or substantially so, so that the entering contact blade tightly grips the blade to insure an efficient electrical contact.

The terminal posts 20, as shown more clearly in Fig. 4, are of a usual construction comprising a threaded bushing secured, at the base thereof, to the block 8 by means of a bolt 21 extending downwardly from the base through the block 8 for engagement with a suitable securing nut, and having a screw 24 entering the upper end to clamp against a conductor inserted through a laterally extending aperture 26. A portion of the bolt 21 extending through the strap 16 is squared and the opening in strap 16 is similarly shaped to prevent rotating of the terminal post with reference to the strap.

The consumer's load may be disconnected, when desired, by breaking the electrical connection between the conducting straps 14 and 16, of any or all of the jaws 12 and terminals 20. This construction is shown in detail in Fig. 3 with reference to one of the jaws. It will be noted, referring to Fig. 3, that the strap 16 upon which the terminal post 20 is supported normally lies slightly below the plane of the lower face of the strap 14, a depression being formed in block 8 for this purpose. The screw 18 extends loosely through the strap 14 into threaded engagement with an aperture in strap 16. Loosening of screw 18 permits strap 16 to drop out of engagement with strap 14 thereby breaking the circuit from the jaw 12 to the terminal post 20. If, therefore, it is desired to disconnect a consumer's circuit, the meter may be removed and screws 18, or any of them, may be loosened and the meter reinserted in position and properly sealed to prevent reconnection of the consumer's circuit.

In the event that the conduit system, with which the chamber 2 is to be used, extends in a horizontal direction, necessitating a rotation of the casing 2, through an angle of 90° from the position shown, it is necessary to alter the positions of the jaws 12, so that the watthour meter may be installed in its proper upright position.

In order to take care of this condition, each jaw has associated with it another aperture 30 in the block 8 equidistant from the center lines of the apertures occupied by screws 22 and of terminals 20; that is, the centers of aperture 30, jaw 12, terminal 20 and screw 18 define a square. After loosening the various screws, the straps 14 and 16 may be rotated 90° toward each other, about the screw 22 and terminal 20 as axes, respectively, to the position shown in Fig. 2 with the screw 18 in the auxiliary aperture 30. This results in the jaw 12 also being rotated 90° to be in position to receive the blade contact of the meter.

It should also be apparent that the construction shown and described is applicable to purposes other than mounting watthour meters, and may be used for mounting indicating instruments, time-switches, or in fact any electrical instrumentality which may be adapted to this type of mounting.

The apertures for the screws 22 of the four contact blades also define a square, so that when the chamber 2 is rotated 90° from the position shown in Fig. 1, and the straps 14 and 16 of each jaw rotated as described in the preceding paragraph, the apparatus is prepared for association with a horizontally extended conduit system with the four jaws properly disposed to receive the contact blades of a meter.

Quite obviously various modifications may be made in the invention without departing from the spirit and scope thereof, and it is desired that only such limitations shall be placed thereon as are imposed by the prior art and set forth in the appended claim.

I claim as my invention:

In a terminal block, four equally spaced apertures defining substantially a square, a terminal post and means extending through one aperture for securing it to said block, a contact jaw and means extending through a diagonally opposite aperture for securing it to said block, electrical conductors extending from said post and jaw and having registering openings in the free ends thereof registering with another of said apertures, the construction being such that the jaw and post with their conductors may be rotated 90° toward each other so that the registering openings in the free ends of the conductors will register with the remaining aperture in said block.

WALTER G. MYLIUS.